United States Patent Office 3,810,908
Patented May 14, 1974

3,810,908
1-(5-NITROTHIAZOL-2-YL)-IMIDAZOLIDINE-2-THIONE
Serge Tchelitcheff, Thiais, France, assignor to Rhone-Poulenc S.A., Paris, France
No Drawing. Filed Mar. 21, 1972, Ser. No. 236,579
Claims priority, application France, Mar. 23, 1971,
7110150
Int. Cl. C07d 99/10
U.S. Cl. 260—306.8 R     1 Claim

ABSTRACT OF THE DISCLOSURE 1-(5-nitrothiazol-2-yl)-imidazolidine-2-thione, which is a new compound having anti-parasitic and anti-microbial properties, is prepared by reacting a 2-alkylthio-(or 2-benzylthio)-1-(5-nitrothiazol-2-yl)-$\Delta^2$-imidazoline with sodium hydrogen sulphide.

---

This invention is concerned with a new therapeutically useful cyclic thiourea, i.e. 1-(5-nitrothiazol-2-yl)-imidazolidine-2-thione of the formula:

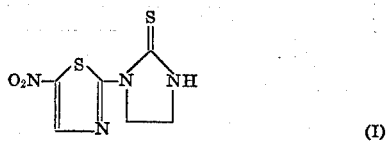

(I)

to a process for its preparation and to therapeutic compositions containing it.

According to a feature of the invention, 1-(5-nitrothiazol-2-yl)-imidazolidine-2-thione is prepared by reacting a compound of the general formula:

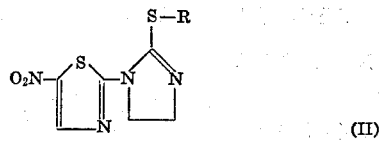

(II)

wherein R represents an alkyl radical containing 1 to 6 carbon atoms or the benzyl radical, with sodium hydrogen sulphide (NaSH), preferably prepared in situ. Generally the reaction is carried out in an organic solvent such as an alkanol containing up to 4 carbon atoms, e.g. methanol, and at a temperature between 0° and 50° C. The sodium hydrogen sulphide may be prepared in situ when an alkanol is the organic solvent by the action of hydrogen sulphide on a sodium alkoxide containing up to 4 carbon atoms, e.g. sodium methoxide.

The compounds of Formula II can be obtained by reacting an imidazoline of the formula:

(III)

wherein R is as hereinbefore defined, with a 5-nitrothiazole derivative of the formula:

(IV)

wherein X represents the acid residue of a reactive ester such as a halogen atom. The reaction is generally carried out in an organic solvent such as an ether (e.g. tetrahydrofuran), an alcohol (e.g. methanol) or an aromatic hydrocarbon (e.g. benzene), at a temperature between 15° C. and the boiling point of the reaction mixture.

The product of Formula I can be purified, if necessary, by physical methods such as distillation, crystallization or chromatography.

1-(5-nitrothiazol-2-yl)-imidazolidine-2-thione possesses valuable therapeutic properties: it has proved particularly active as an anti-bilharzia agent, as an anti-trichomonas agent, as an anti-amoeboid agent, as an anthelmintic agent, as an anti-giardiasis agent, as an anti-coccidial agent and as an anti-microbial agent.

The new cyclic thiourea of the present invention is less toxic and more active than 1-(5-nitrothiazol-2-yl)-imidazolidin-2-one(niridazole) which is described in the specification of British Pat. No. 986,562 granted to Ciba Limited on an application filed May 22, 1963.

Thus, in the case of mice, the compound of Formula I administered in suspension once daily for 3 days is half as toxic as niridazole.

In the case of monkeys [Maccaca mulatta (rhesus variety)] infested with Schistosoma mansoni, the compound of the present invention is more active than the closely related compound of the prior art. At a dose of the new compound of 50 mg./kg. animal body weight per day for 5 days, administered orally, a total destruction of almost all the worms is observed (the surviving worms being very damaged) whereas niridazole has an action only on the egg-laying of the female worms. At a dose of 30 mg./kg. animal body weight per day for 5 days, administered orally, the compound of the present invention causes a reduction in the number of worms and a decrease of the egg-laying of the female worms, whereas niridazole only has an action of short duration on the egg-laying of the female worms.

The compound of Formula I is active against subcutaneous abscess in mice infected with Trichomonas vaginalis, against intestinal amoebiasis of weanling rats and against hepatic amoebiasis of hamsters infected with Entamoeba histolytica. The dose which eliminates 50% of the parasites in the treated animals ($CD_{50}$) is between 40 and 150 mg./kg. animal body weight per day, administered orally.

In the same way, the dose $CD_{50}$ against giardiasis of mice is between 5 and 10 mg./kg. animal body weight per day, administered orally.

The dose $CD_{50}$ against experimental oxyuriasis of mice infected with Aspiculuris tetraptera is about 60 mg./kg. animal body weight per day, administered orally.

The minimum active concentration of the compound of the invention in chicken feedstuffs against experimental coccidiosis of chickens infected with Eimeria tenella is 0.01% by weight.

As well as its very pronounced anti-parasitic activity, the compound of Formula I exhibits particularly valuable anti-microbial properties. Its activity is exhibited more particularly in vitro, against Escherichia coli, Salmonella typhimurium, Salmonella gallinarum, Welchia perfringens and Clostridium sporogenes.

The following examples illustrate the preparation of the compound of the invention.

EXAMPLE 1

Hydrogen sulphide is bubbled into a solution of sodium methoxide (0.01 mole) in methanol (25 cc.) until the solution is neutral with respect to thymolphthalein. Finely powdered 2-methylthio-1-(5-nitrothiazol-2-yl)-$\Delta^2$-imidazoline (2.5 g.) is then added, and the mixture stirred for 16 hours at a temperature of about 20° C. The suspension is filtered. The solid is washed with methanol (25 cc.), and then dried under reduced pressure (20 mm. Hg) to give 1-(5-nitrothiazol-2-yl)-imidazolidine-2-thione (2 g.), melting at 274° C.

2-methylthio-1-(5-nitrothiazol-2-yl) - $\Delta^2$ - imidazoline, employed as starting material, can be prepared in the following manner:

2-bromo-5-nitrothiazole (2.1 g.) is added, all at once, to a solution of 2-methylthio-$\Delta^2$-imidazoline (2.3 g.) in methanol (25 cc.) and then the mixture is heated under reflux for 1 hour. After cooling, the resulting precipitate is filtered off. 2-methylthio-1-(5-nitrothiazol-2 - yl) - $\Delta^2$-imidazoline (1.2 g.), melting at 190° C., is thus obtained.

EXAMPLE 2

Hydrogen sulphide is bubbled into a solution of sodium methoxide (0.14 mole) in methanol (400 cc.) until the solution is neutral with respect to thymolphthalein. Finely powdered 2-benzylthio-1-(5-nitrothiazol-2-yl)-$\Delta^2$ - imidazoline (45 g.) is then added, and the mixture is stirred for 16 hours at a temperature of about 20° C. The suspension is filtered and the resulting solid is washed with methanol (100 cc.) to give 1-(5-nitrothiazol-2-yl)-imidazolidine-2-thione (28 g.), melting at 274° C.

2-benzylthio-1-(5-nitrothiazol-2-yl) - $\Delta^2$ - imidazoline, melting at 160° C., which is used as starting material, can be prepared by reacting 2-benzylthio-$\Delta^2$-imidazoline (154 g.) with 2-bromo-5-nitrothiazole (84 g.).

The present invention also includes pharmaceutical and veterinary compositions which comprise, as active ingredient, 1-(5-nitrothiazol-2-yl)-imidazolidine - 2 - thione in association with a carrier or coating generally used in the preparation of pharmaceutical and veterinary compositions. The compositions are preferably in a form suitable for oral administration.

Tablets, pills, powders or granules can be used as solid compositions for oral administration. In these compositions the compound is mixed with one or more inert diluents, such as sucrose, lactose or starch. These compositions can also contain substances other than diluents, for example lubricants such as magnesium stearate or a dispersing agent.

Pharmaceutically acceptable emulsions, solutions, suspensions, syrups and elixirs, containing inert diluents such as water or paraffin oil, can be used as liquid compositions for oral administration. These compositions can also contain substances other than the diluents, such as, for example, wetting agents or sweetening or flavoring agents.

The percentage of 1-(5-nitrothiazol - 2 - yl)-imidazolidine-2-thione in the compositions may be varied, it being necessary that it should constitute a proportion such that a suitable dosage shall be obtained.

In human therapy, the compound of the present invention can be used to combat the bilharzioses due to *Schistosoma mansoni*, *Schistosoma haematobium* and to *Schistosoma japonicum*, in daily doses, administered orally, of between 10 and 50 mg./kg. body weight. These doses can be repeated at regular intervals of several days or several weeks to achieve complete elimination of the parasite.

Generally, the physician or veterinary surgeon will decide the posology which is considered most appropriate, depending on the subject to be treated, the age, the weight, the degree of infestation and all other factors peculiar to the subject.

The following example illustrates therapeutic compositions according to the invention.

EXAMPLE 3

Tablets having the following composition are prepared in accordance with the usual technique:

|  | Mg. |
|---|---|
| 1-(5-nitrothiazol-2-yl)-imidazolidine-2-thione | 500 |
| Wheat starch | 150 |
| Colloidal silica | 40 |
| Magnesium stearate | 10 |

I claim:
1. 1-(5-nitrothiazol-2-yl)-imidazolidine-2-thione.

References Cited

FOREIGN PATENTS

| 1,265,810 | 5/1961 | France | 260—306.8 |
| 1,360,047 | 3/1964 | France | 260—306.8 |

OTHER REFERENCES

ABU-OUF et al.: Chem. Abstracts, 75:35879U (1971).

RICHARD J. GALLAGHER, Primary Examiner

U.S. Cl. X.R.

424—270